United States Patent
Suzuki

(10) Patent No.: US 6,504,958 B1
(45) Date of Patent: Jan. 7, 2003

(54) OPTICAL DEVICE

(75) Inventor: Noboru Suzuki, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/282,003

(22) Filed: Mar. 29, 1999

(30) Foreign Application Priority Data

Apr. 3, 1998 (JP) ............................................. 10-091445

(51) Int. Cl.⁷ ............................................... G03B 3/00
(52) U.S. Cl. ..................................... 382/255; 396/89
(58) Field of Search ................................. 382/254–256; 396/89, 93; 359/319, 379–383, 698

(56) References Cited

U.S. PATENT DOCUMENTS

| | | | |
|---|---|---|---|
| 4,984,001 A | * 1/1991 | Himuro | 396/88 |
| 5,153,633 A | * 10/1992 | Otani | 396/13 |
| 5,202,555 A | 4/1993 | Ishida et al. | 250/201.8 |
| 5,287,137 A | 2/1994 | Hara et al. | 354/195.12 |
| 5,654,757 A | 8/1997 | Murakami et al. | 348/357 |

FOREIGN PATENT DOCUMENTS

| | | |
|---|---|---|
| EP | 0 394 901 A2 | 10/1990 |
| EP | 0 818 697 | 1/1998 |
| JP | 2065477 | 3/1990 |
| JP | 2090131 | 3/1990 |
| JP | 4212941 | 8/1992 |
| JP | 5161060 | 6/1993 |
| JP | 7218808 | 8/1995 |
| JP | 11271593 | 10/1999 |

OTHER PUBLICATIONS

European Search Report dated Jul. 22, 1999.

* cited by examiner

Primary Examiner—Thomas D. Lee
Assistant Examiner—Stephen Brinich
(74) Attorney, Agent, or Firm—Morgan & Finnegan LLP

(57) ABSTRACT

This invention provides an image sensing lens device which can communicate independently of the resolution of a position detection means of an optical means in a communication with a camera that pertains to driving control of the optical means. More specifically, the lens device imaginarily divides the movable range using predetermined normalized information more than the minimum required resolution of the optical system, and communicates position information of the optical system between a lens and camera, between a lens and accessory, and the like using the imaginary normalized position information.

50 Claims, 5 Drawing Sheets

FIG. 6

| OUTPUT PULSE NUMBER PER ONE ROTATION OF ENCODER PPEnc [P/R] 2500 |||||
|---|---|---|---|---|
| MOTOR GEAR DIAMETER φMotor [mm] | ENCODER GEAR DIAMETER φEnc [mm] | COUNTED PULSE NUMBER PPTotal[pulse] |||
| | | NUMBER OF MOTOR ROTATION BETWEEN INF AND MOD ||
| | | NRot=20 | NRot=100 |
| 20 | 20 | 50000 | 250000 |
| 20 | 10 | 100000 | 500000 |
| 5 | 20 | 12500 | 62500 |

FIG. 7

| OUTPUT PULSE NUMBER PER ONE ROTATION OF ENCODER PPEnc [P/R] 2500 |||||
|---|---|---|---|---|
| MOTOR GEAR DIAMETER φMotor [mm] | ENCODER GEAR DIAMETER φEnc [mm] | COUNTED PULSE NUMBER PPTotal[pulse] |||
| | | NUMBER OF MOTOR ROTATION BETWEEN INF AND MOD ||
| | | NRot=20 | NRot=100 |
| 20 | 20 | 200000 | 1000000 |
| 20 | 10 | 400000 | 2000000 |
| 5 | 20 | 50000 | 250000 |

OPTICAL DEVICE

BACKGROUND OF THE INVENTION

1. Field of the Invention

The present invention relates to an optical device such as a television image sensing lens or the like used in, e.g., television image sensing.

2. Related Background Art

In a conventional broadcast television camera system, communications are made using analog signals as a camera-lens interface. For example, the voltages for determining the positions of a focus lens and iris (IRIS) and determining the speed of a zoom lens are designated in a lens, so as to control the lens system. Conversely, the voltages indicating the positions of the focus lens, zoom lens, and IRIS are sent to the camera side to inform the camera of lens information.

On the other hand, in a lens, a feedback system that uses a potentiometer as a position sensor is built to realize an analog servo control system.

Since an increase in the number of kinds of an analog signal and its precision have virtually reached their limits, a camera-lens communication function often uses a serial interface in recent years.

SUMMARY OF THE INVENTION

One aspect of the application is to provide a device which normalizes data communications and performs appropriate communication processing in serial communications between the lens and camera or the lens and accessory.

One aspect of the application is to provide an optical device which comprises movable optical means, position detection means for detecting a position of the optical means, and driving control means for controlling to drive the optical means on the basis of an output from the position detection means and a position command, comprising: normalization means for normalizing at least one of position information from the position detection means and the position command to position information on the basis of a predetermined position resolution.

One aspect of the application is to provide the device which also has position command conversion means for converting the position command into a position command corresponding to the position resolution of the position detection means on the basis of a position resolution of the position command.

One aspect of the application is to provide the device which also has detected position information conversion means for converting detected position information output from the position detection means into position information on the basis of a position resolution of the position command.

One aspect of the application is to provide an optical device that comprises movable optical means, position detection means for detecting a position of the optical means between first and second positions by dividing the position into a plurality of values between the first and second values, and driving control means for driving the optical means on the basis of a position command value sent from an external device and a position signal detected by the position detection means, comprising: normalization means for normalizing the position command value sent from the external device into a position command value on the basis of a position resolution, the driving control means driving the optical means to a position corresponding to the position command value on the basis of the normalized position command value and a detected position signal output from the position detection means.

One aspect of the application is to provide an optical device that comprises movable optical means, detection means for detecting a position of the optical means between first and second positions by dividing the position into a plurality of values between the first and second values, and driving control means for driving the optical means on the basis of a position command value sent from an external device and a position signal detected by the detection means, comprising: normalization means for normalizing the position signal detected by the detection means into position information on the basis of a position resolution, the normalized position information being sent to the external device.

Other objects of the present invention will become apparent form the following description of the embodiment taken in conjunction with the accompanying drawings.

BRIEF DESCRIPTION OF THE DRAWINGS

FIG. 6 is a pulse count table;

FIG. 7 is a pulse count table; and

DESCRIPTION OF THE PREFERRED EMBODIMENTS

First Embodiment

Figure 1:
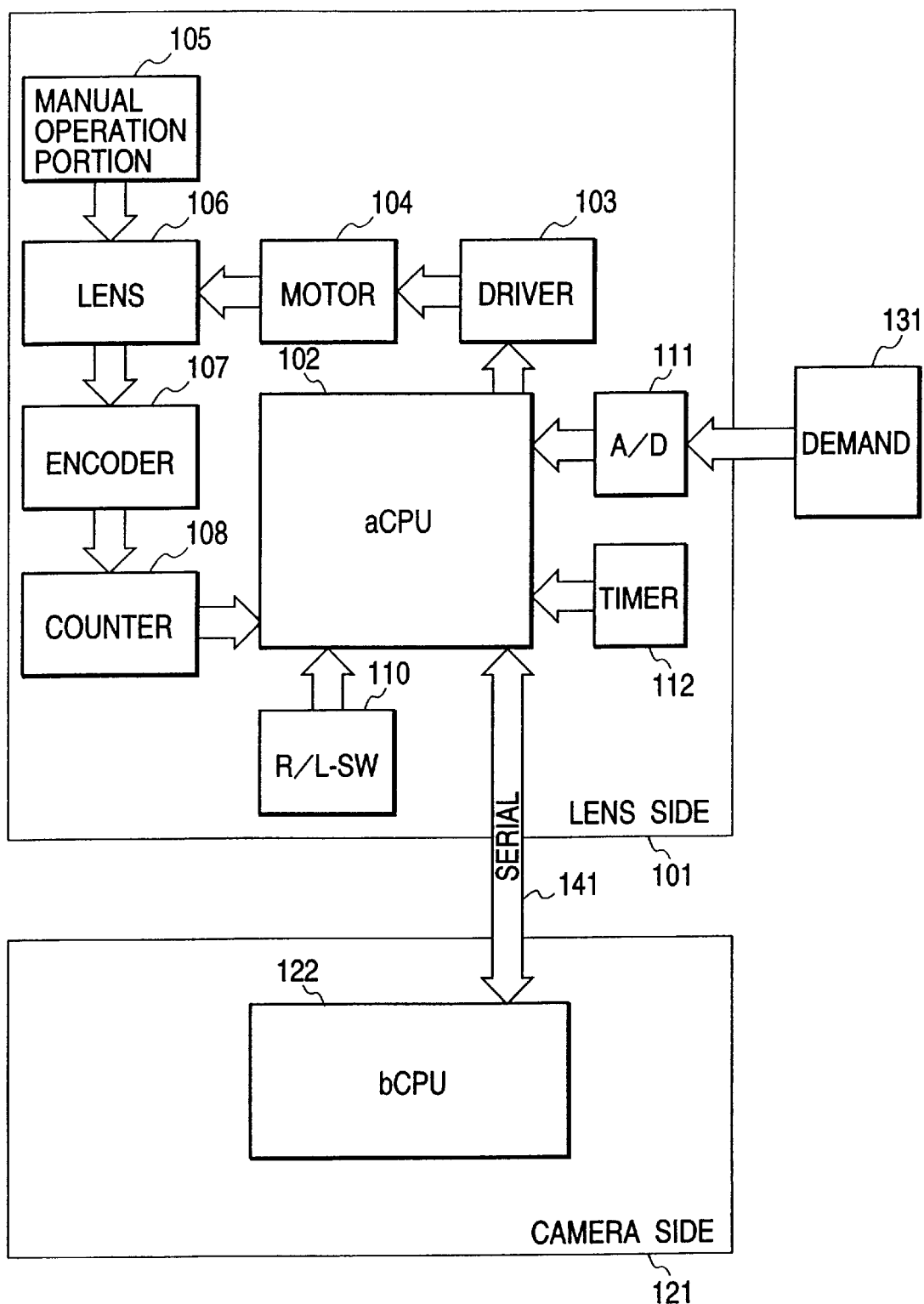
FIG. 1 is a block diagram showing the system arrangement according to an embodiment of the present invention.

FIG. 1 is a block diagram showing an optical device according to the first embodiment of the present invention. The optical device shown in FIG. 1 has a lens side 101 for image sensing, and a camera side 121 for sensing an image via an optical system of the lens side 101.

A controller (to be abbreviated as an aCPU hereinafter) 102 manages the lens side and controls a servo system. A driver 103 drives a motor 104. An optical lens 106 is connected to the motor 104. An encoder 107 detects the position of the optical lens 106. A counter 108 counts the output from the encoder 107.

A timer 112 and the counter 108 are connected to the aCPU 102, which can detect the position and speed of the optical lens 106 using the values of the counter 108 and timer 112.

A manual operation portion 105 is used for manually moving the optical lens 106. An R/L-SW 110 is used for selecting whether the lens side is controlled in a remote mode or local mode (to be described later). A demand 131 is connected to the lens side 101, and an A/D converter 111 for A/D-converting a command from the demand 131 is connected, so that a demand command value for controlling the optical lens 106 can be input to the aCPU 102.

The camera side 121 comprises a controller (to be abbreviated as a bCPU hereinafter) 122, which can make a serial communication 141 with the aCPU 102 in the lens side 101.

The remote and local modes to be selected by the R/L-SW 110 will be explained below. In the remote mode, the optical lens 106 is controlled by a control command supplied from the bCPU 122 in the camera side 121. In the local mode, the optical lens 106 is controlled by selecting a control command from the demand 131.

Figure 5:
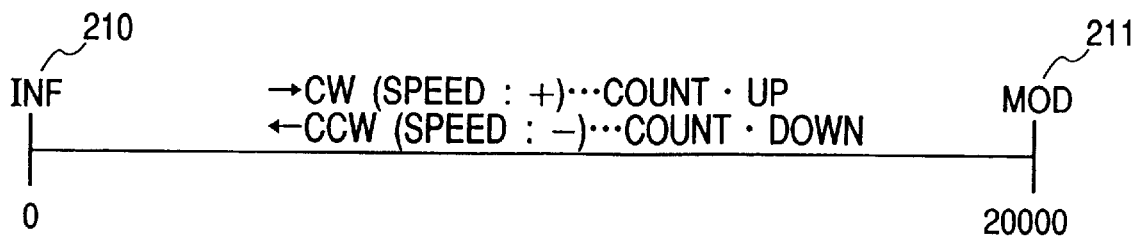
FIG. 5 is a view showing the lens moving direction by an encoder shown in FIG. 1.

The relationship between the moving direction of the optical lens 106 and the count value of the counter 108 will be described below with reference to FIG. 5. Assume that the optical lens 106 is a focus lens.

If the counter value of the counter 108 assumes zero at an infinity (INF) end 210 of the focus lens, the counter value of the counter 108 assumes 20000 at a minimum object distance (MOD) end 211.

When the focus lens rotates in the CW direction, it moves toward the MOD end 211, and the counter 108 counts up. When the focus lens rotates in the CCW direction, it moves toward the INF end 210, and the counter 108 counts down.

While the focus lens is moving toward the MOD end 211, its speed assumes a positive value; while the focus lens is moving toward the INF end 210, its speed assumes a negative value.

Figure 2:
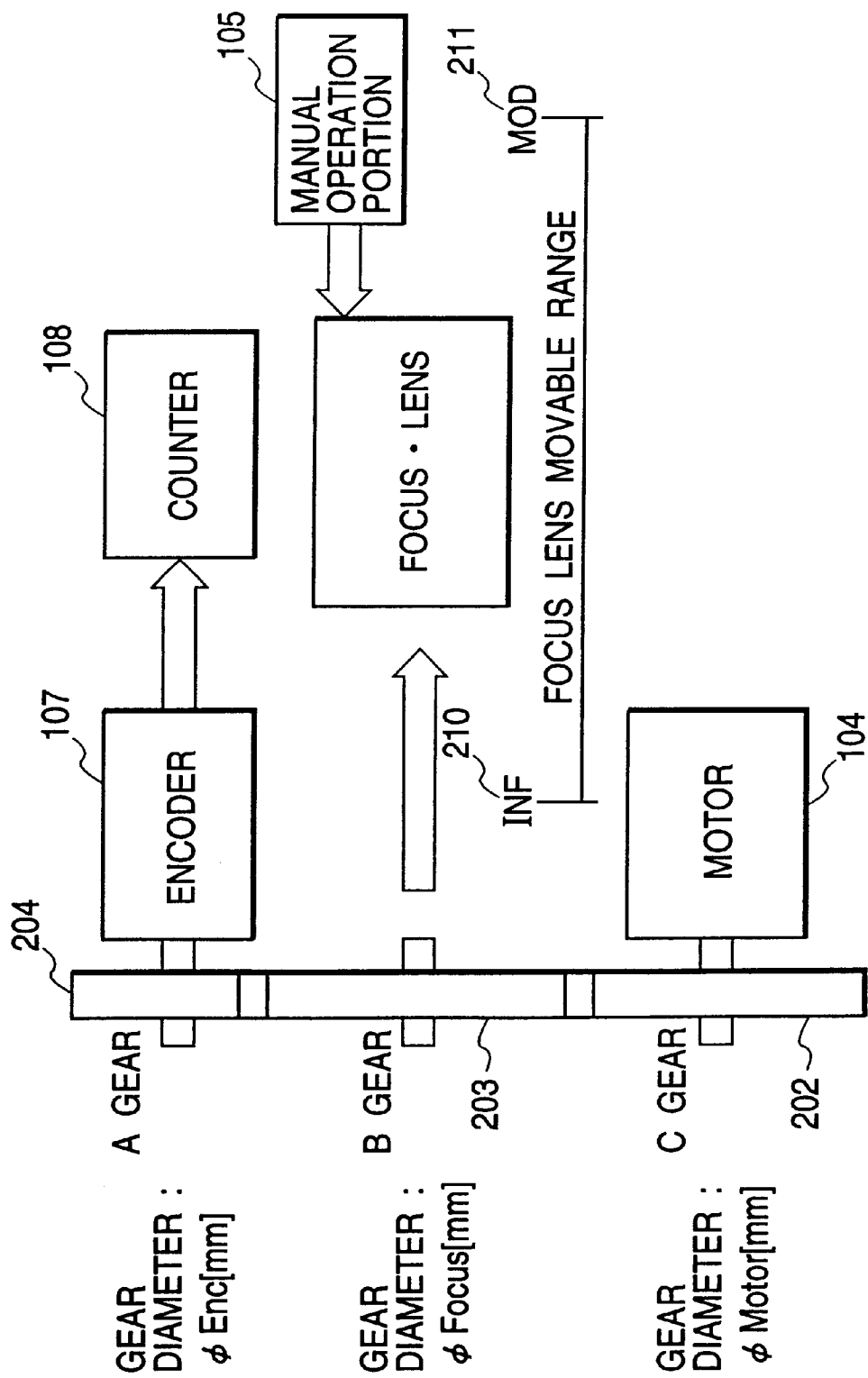
FIG. 2 is a schematic diagram showing an encoder pulse output mechanism shown in FIG. 1.

An encoder pulse output mechanism for detecting the position and speed of the focus lens will be described below with reference to FIG. 2.

Let $\phi$Motor [mm] be the diameter of a C gear 202 attached to the drive motor 104, and $\phi$Focus [mm] be the diameter of a B gear 203 which meshes with the C gear 202. A focus lens 207 is movable by the B gear 203 from the INF (infinity) end 210 to the MOD (minimum object distance) end 211.

Furthermore, the B gear 203 meshes with an A gear 204 attached to the encoder 107, and the pulse output of the encoder 107 is input to the counter 108. Let $\phi$Enc [mm] be the diameter of the A gear, and PPEnc [P/R] be the output pulses per rotation of the encoder 107. The focus lens 207 is also movable by the manual operation portion 105 from the INF end 210 to the MOD end 211.

Also, a servo mode or manual mode can be selected by a servo/manual mode selection SW (not shown). In the servo mode, the focus lens 207 is driven by the motor 104. In the manual mode, the focus lens 207 can be operated by the manual operation portion 105.

Furthermore, a clutch (not shown) is connected to the motor 104. In the manual mode, the encoder 107 is rotated upon movement of the focus lens 207, but the driving force of the motor 104 is not transmitted to the focus lens 207 via the clutch.

In this arrangement, a count value PPRot of the counter 108 per rotation of the motor 104 is given by:

$$\text{PPRot} = \phi\text{Motor} \div \phi\text{Enc} \times \text{PPEnc} \quad (1)$$

Let NRot be the number of rotations of the motor 104 required for moving the focus lens 207 from the INF end 210 to the MOD end 211. Then, the number PPTotal of output pulses generated by the encoder 107 when the focus lens 207 moves from the INF end 210 to the MOD end 211 is given by:

$$\text{PPTotal} = \text{PPRot} \times \text{NRot} \quad (2)$$

The count value of the counter 108 that counts the output pulses from the encoder 107 when the focus lens 207 moves from the INF end 210 to the MOD end 211 is calculated under the following conditions using equations (1) and (2) above.

[Condition]
  the number PPEnc of output pulses per rotation of encoder 107=2,500 [P/R]
  the diameter $\phi$Enc of the A gear attached to the encoder 107=10 [mm]
  the diameter $\phi$Motor of the C gear attached to the motor 104=20 [mm]
  the number NRot of rotations of the motor 104 required for moving the focus lens 207 from the INF end 210 to the MOD end 211=100 [rotations]

At this time, if the count value of the counter 108 at the INF end 210 is "0", the count value PPTotal of the counter 108 at the MOD end 211 is:

$$\text{PPTotal}=20 \div 10 \times 2{,}500 \times 100 = 500{,}000 \text{ [Pulses]}$$

Similarly, FIG. 6 shows examples of the count value PPTotal calculated upon changing PPEnc, $\phi$Enc, $\phi$Motor, and NRot.

Figure 8A:
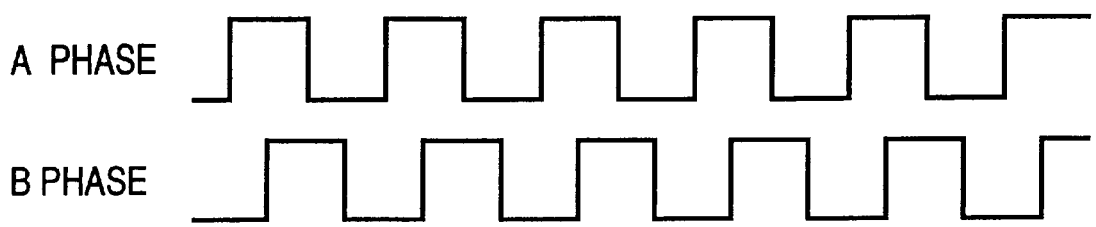
FIGS. 8A and 8B are waveform charts respectively showing the encoder pulse output waveforms.
Figure 8B:
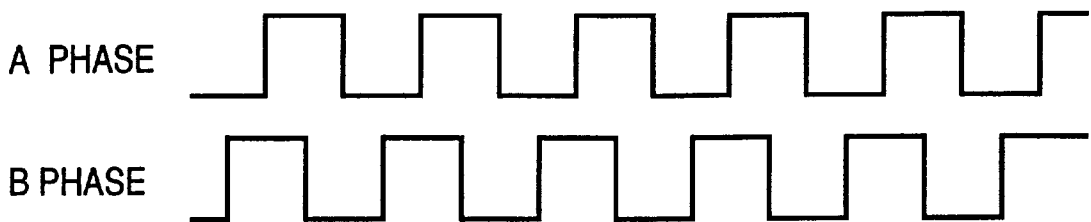

The encoder 107 outputs pulses in a dual-phase pulse output scheme, i.e., using two phases normally called A and B phases which are shifted through 90°. For example, when the encoder 107 rotates in the CW direction, the A phase leads 90° relative to the B phase, as shown in FIG. 8A; when the encoder 107 rotates in the CCW direction, the A phase delays 90° relative to the B phase, as shown in FIG. 8B.

To cope with such phase lead and delay, the counter 108 counts by detecting the edges of the A and B phases. Hence, a 4-fold value is consequently counted. At this time, when the A phase leads the B phase, the counter 108 counts up; when the A phase delays from the B phase, the counter 108 counts down. FIG. 7 shows an example when the 4-fold result is counted.

In this way, the count value PPTotal of the counter 108 within the moving range of the focus lens 207 from the INF end 210 to the MOD end 211 is influenced by the number NRot of rotations of the motor 104 depending on the moving range of the focus lens, the diameter $\phi$Motor of the C gear 202 attached to the motor 104, the diameter $\phi$Enc of the A gear attached to the encoder 107, and the number PPEnc of output pulses per rotation of the encoder 107, and its value has a considerably broad range.

Figure 3:
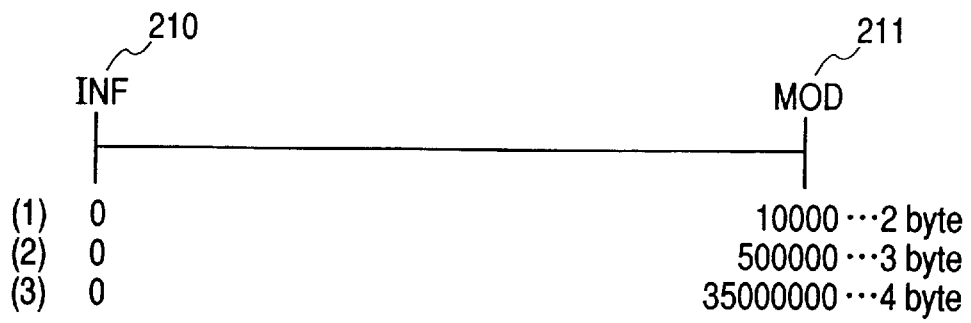
FIG. 3 is a view showing setups of the number of encoder output pulses shown in FIG. 1.

The patterns of the count value of the counter 108 at the MOD end 211 when the INF end 210 of the focus lens 207 is defined as a reference value "0" (the count value of the counter 108) will be explained below with reference to FIG. 3.

For example, if the count value of the counter 108 at the MOD end 211 assumes 10,000, 500,000, and 35,000,000, the numbers of bytes required for these values are:
  (1) in case of 10,000 pulses 2 bytes
  (2) in case of 500,000 pulses 3 bytes
  (3) in case of 35,000,000 pulses 4 bytes This means that the bCPU 122 of the camera side 121 must use different data depending on the types of lens side 101 when it designates the position of the focus lens 207 using the serial communication 141. For example, when the bCPU 122 of the camera side instructs to move the focus lens 207 to a position "5,000" via the serial communication 141,
  in case of (1), since 5,000/10,000=0.5 (=50%), the aCPU 102 of the lens side 101 moves the lens to the center between the INF end 210 and MOD end 211;
  in case of (2), since 5,000/500,000=0.01 (=1%), the aCPU 102 moves the lens to a position in the neighborhood of the INF end 210; and in case of (3), since 5,000/35,000,000≅0.00014 (=0.014%), the aCPU 102 does not nearly move the lens from the INF end 210.

Hence, the bCPU 122 of the camera side 121 must detect the resolution (the number of moving pulses required for moving the lens over the entire range from the INF end 210 to the MOD end 211) of the effective moving range of the focus lens 207 of the lens side 101. This detection is done by exchanging information via the serial communication 141 upon completion of initialization of the camera side 121 and lens side 101. Case (2) will be exemplified below. When the bCPU 122 of the camera side 121 requires the aCPU 102 of the lens side 101 of the position resolution information of the focus lens 207 via the serial communication 141, the aCPU 102 of the lens side 101 need only transfer the position "0" of the INF end 210 and the position "500,000" of the MOD end 211 to the bCPU 122 of the camera side 121 via the serial communication 141.

However, as can be seen from examples (1) to (3) above, the numbers of bytes of the position information of the focus lens 107 vary. This means that computation by the bCPU 122 of the camera side 121 requires different data lengths depending on the types of lens side 101.

For example, assume that the bCPU 122 of the camera side 121 is a 16-bit microcomputer. At this time, in case of (1), computation can be done using a 2-byte (16 bits, int) length. However, in case of (2), computation must be done using a 4-byte (32 bits, long) length. Furthermore, in case of (3), floating-point (float) computation is required. Since the computation often requires high speed, it is preferably done as fixed-point processing. Furthermore, computation using an int value (16-bit data length in case of a 16-bit microcomputer; 32-bit data length in case of a 32-bit microcomputer) is preferably done.

Figure 4:
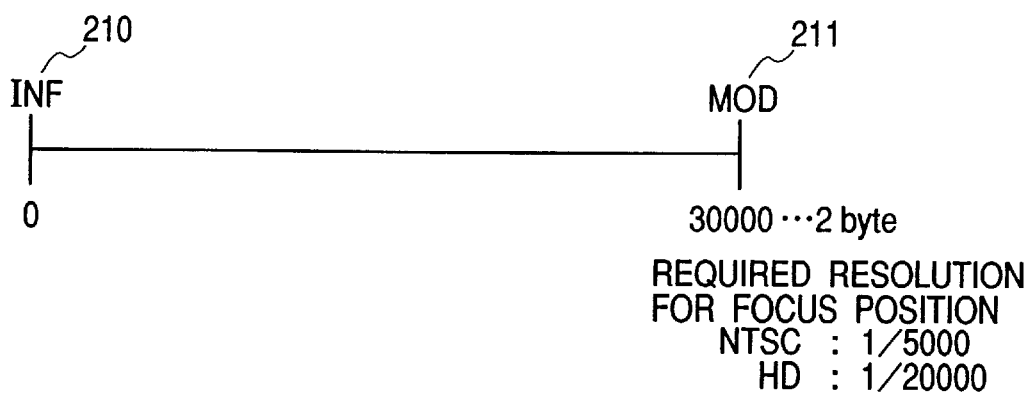
FIG. 4 is a view showing the number of normalization steps shown in FIG. 3.

In view of such problem, as shown in FIG. 4, the resolution between the INF end 210 and MOD end 211 is normalized, and a position command is exchanged always using fixed data between the lens side 101 and camera side 121 via the serial communication 141. As a result, the camera side 121 need not detect any resolution of the focus lens 207 depending on the types of lens side 101.

The required position resolution of the focus lens 207 will be explained below. The resolution calculated from an MTF (Modulation Transfer Function: a contrast value obtained by imaging a sine wave chart by a lens) and sensitivity is around 1/5,000 in case of NTSC (National Television System Committee), and is around 1/20,000 in case of HD.

Since the position resolution is required for adjusting the focus of a predetermined lens within the range from the MOD to INF, the entire range can be expressed by 5,000 in case of 1/5,000, and can be expressed by 20,000 in case of 1/20,000. Hence, the number of divisions of the lens position within the entire range from the INF to MOD required from the resolution can be set to be 5,000 or 20,000 or more in the above-mentioned cases in consideration of the resolution.

As the normalized position information, for example, if the entire range is defined as "30,000", the INF end 210 is defined as "0", and the MOD end 211 is defined as "30,000", a sufficient resolution for the focus lens 207 can be obtained.

When such normalized data are used, if a position command "15,000" of the focus lens 207 is given, the aCPU 107 of the lens side 101 moves the focus lens 207 to the position corresponding to the ratio:

in case of (1),
(10,000×15,000÷30,000)÷10,000=0.5 in case of (2),
(500,000×15,000÷30,000)÷500,000=0.5 in case of (3),
(35,000,000×15,000÷30,000)÷35,000,000=0.5

More specifically, independently of the types of lens side 101 (the number of pulses from the INF end 210 to the MOD end 211 of the focus lens 207), the aCPU 102 moves the focus lens 207 to the middle point position between the INF end 210 and MOD end 211.

The normalized position information (30,000 in the above case) may be exchanged using the serial communication 141 upon completion of initialization of the lens side 101 and camera side 121, or may be predetermined depending on an information communication format between the lens side 101 and camera side 121.

When a command position PPFocusCmd of the focus lens 207 in the lens side 101 is calculated based on the normalized position command, the following equation can be used.

Let
NorInfMod: normalized position information in the entire range between the INF end and MOD end
PPInfMod: the number of effective pulses between the INF end and MOD end
NorFocusCmd: normalized position command then $$PPFocusCmd = PPInfMod \times NorFocusCmd \div NorInfMod \quad (3)$$

For example, when NorInfMod is defined as "30,000" described above, PPInfMod (the number of pulses produced upon moving the lens from the INF end to MOD end) is "50,000" and the normalized position command (a position command which is output from the camera, and is used for commanding a value within the defined NorInfMod upon recognizing the overall range to be 30,000, e.g., 15,000 to move the lens to the middle position, since NorInfMod is defined as 30,000 in advance) is "15,000", PPFocusCmd is "25,000".

Even when PPInfMod is "100,000", when NorFocusCmd is "15,000", PPFocusCmd is "50,000".

Hence, when a lens having PPInfMod=50,000 is mounted, PPFocusCmd is "25,000" when NorFocusCmd= 15,000. Therefore, the lens can be set at the middle position by driving until the value of the counter 108 reaches PPFocusCmd.

Likewise, when a lens having PPInfMod=100,000 is mounted, since PPFocusCmd=50,000, the lens can be set at the middle position.

Note that equation (3) is computed by the aCPU 102 of the lens side, and NorInfMod is defined in advance in the camera system. For this reason, the camera need only send NorFocusCmd to the lens to attain the aforementioned control.

Conversely, normalized position information NorFocusInf is calculated from the current position PPFocusInf (the count value of the counter 108) of the focus lens 207 by:

$$NorFocusInf = NorInfMod \times PPFocusInf \div PPInfMod \quad (4)$$

When this normalized position information NorFocusInf is transferred from the lens side 101 to the camera side 121 via the serial communication 141, the camera side 121 can detect the position of the focus lens 207 independently of the types of lens side 101.

In the above description, the lens 106 of the lens side 101 has exemplified a focus lens. Also, the present invention can be applied to other optical systems such as a zoom lens, IRIS, and the like. Note that equation (4) is computed at the lens side.

Furthermore, the present invention can also be applied to accessories other than the camera side.

Also, an encoder is used as a means for detecting the lens position, but a combination of a potentiometer and A/D converter may be used. Note that the value "30,000" is used as the normalized position information but the value itself does not have any meaning and other values may be used. Furthermore, a serial communication is used between the lens side and camera side, but a parallel communication may be used.

A communication using normalized position is not limited to that between the lens side 101 and camera side 121. For example, the aCPU 102 of the lens side 101 receives a command from the demand 131 as an accessory via the A/D converter 111. When the demand 131 has a CPU and also a communication function similar to that of the camera side, it can communicate using the normalized lens position.

More specifically, a communication of the normalized position information of the lens 106 can be applied to other systems (including an accessory) like that between the lens side 101 and camera side 121.

Furthermore, the present invention can be applied to various systems that communicate position information, e.g., a system between a pan-tilt system (panpod) and its controller. In this embodiment, focus lens position control has been exemplified. The present invention can also be applied to position control of a movable member such as iris position control.

What is claimed is:

1. An optical device that comprises movable optical means, position detection means for detecting a position of said optical means between first and second positions by dividing the position into a plurality of values between the first and second values, and driving control means for driving said optical means on the basis of a position command value sent from an external device, and a position signal detected by said position detection means, comprising:

normalization means for normalizing the position command value sent from said external device into a position command value on the basis of a position resolution, said driving control means driving said optical means to a position corresponding to the position command value on the basis of the normalized position command value and a detected position signal output from said position detection means.

2. A device according to claim 1, wherein said normalization means normalizes the position command value on the basis of normalized position information which represents a moving range of said optical means from the first to second positions as a normalized value, the sent position command value, and a value corresponding to a value of a difference between the first and second values, which represents the range between the first and second positions of said optical means.

3. A device according to claim 2, wherein said normalization means obtains the normalized position command value by multiply value obtained by multiplying a ratio of the normalized position information to the position command value, by the value corresponding to the value of the difference between the first and second values.

4. A device according to claim 1, wherein said optical device and said external device make a digital communication.

5. A device according to claim 2, wherein the normalized position information represents the moving range from the first to second positions as a predetermined value.

6. A device according to claim 1, wherein said external device is a camera, and said optical device is a lens device.

7. An optical device that comprises movable optical means, detection means for detecting a position of said optical means between first and second positions by dividing the position into a plurality of values between the first and second values, and driving control means for driving said optical means on the basis of a position command value sent from an external device, and a position signal detected by said detection means, comprising:

normalization means for normalizing the position signal detected by said detection means into position information on the basis of a position resolution, the normalized position information being sent to said external device.

8. A device according to claim 7, wherein said normalization means normalizes the position signal into the normalized position information on the basis of normalized position information which represents a moving range of said optical means from the first to second positions as a normalized value, a value corresponding to a value of a difference between the first and second values, which represents the range between the first and second positions of said optical means, and the position signal detected by said detection means.

9. A device according to claim 7, wherein said normalization means obtains the normalized position information by multiply value obtained by multiplying a ratio of the detected position signal to the value corresponding to the value of the difference between the first and second values, which represents the range between the first and second positions of said optical means, by the normalized position information which represents a moving range of said optical means from the first to second positions as a normalized value.

10. A device according to claim 7, wherein said optical device and said external device make a digital communication.

11. A device according to claim 8, wherein the normalized position information represents the moving range from the first to second positions as a predetermined value.

12. A device according to claim 7, wherein said external device is a camera, and said optical device is a lens device.

13. An optical device which comprises movable optical means, position detection means for detecting a position of said optical means, and driving control means for controlling to drive said optical means on the basis of an output from said position detection means and a position command, comprising:

normalization means for normalizing at least one of position information from said position detection means and the position command to position information on the basis of a predetermined position resolution; and position command means which generates the position command having a position resolution different from said predetermined position resolution.

14. A device according to claim 13, wherein said normalization means has position command conversion means for converting the position command into a position command corresponding to the position resolution of said position detection means on the basis of a position resolution of the position command.

15. A device according to claim 13, wherein said normalization means has detected position information conversion means for converting detected position information output from said position detection means into position information on the basis of a position resolution of the position command.

16. A device according to claim 13, further comprising communication means for making a communication using a digital signal with a camera device or a control device connected to said optical device, and wherein said normalization means obtains the position command via said communication means.

17. A device according to claim 16, further comprising means for receiving or transmitting position resolution information of the position command via said communication means.

18. An optical device which comprises movable optical means, and position detection means for detecting a position of said optical means, comprising:
   detected position information conversion means for converting detected position information output from said position detection means into position information on the basis of a predetermined position resolution, wherein
   a position resolution of said position detection means is different from said predetermined position resolution.

19. A device according to claim 18, further comprising communication means for communicating with a camera device or control device connected to said optical device using a digital signal, and transmission means for transmitting an output from said detected position information conversion means to said camera device or said control device via said communication means.

20. A device according to claim 19, further comprising means for receiving or transmitting the predetermined position resolution information via said communication means.

21. An optical device which comprises position information forming means for forming position data of a movable member which is movable within a predetermined range, by dividing a range between predetermined first and second positions, and drives said movable member in accordance with a normalized position command value within a range between third and fourth values, which is different from the range between the first and second values, comprising:
   control means for moving said movable member to a position within the range between the first and second positions corresponding to the normalized position command value on the basis of a value that represents a width of the range between the third and fourth values, the normalized position command value, and a value that represents a width of the range between the first and second values.

22. A device according to claim 21, wherein the third value is equal to the first value.

23. A device according to claim 21, wherein said control means moves said movable member to a position within the range between the first and second positions corresponding to the normalized command value on the basis of a ratio of the value that represents the width of the range between the third and fourth values to a value of a difference between the third value and the normalized position command value, and the value that represents the width of the range between the first and second positions.

24. A device according to claim 23, wherein said control means calculates a moving position from the first position corresponding to the normalized position command value by multiplying the ratio of the value that represents the width of the range between the third and fourth values to the value of the difference between the third value and the normalized position command value, by the value that represents the width of the range between the first and second positions.

25. An optical device which comprises position information forming means for forming data which represents a current position of a movable member, which is movable within a predetermined range, between first and second values by dividing a range between predetermined first and second positions, and forms a signal value that indicates the position of said movable member on the basis of a normalized position command value in a range between the third and fourth values, which is different from the range between the first and second values, comprising:
   control means for normalizing the data representing the position of the movable member to convert the data into a signal value within the range between the third and fourth values, on the basis of the data output from said position information forming means, a value that represents a width of the range between the third and fourth values, and a value that represents a width of the range between the first and second values.

26. A device according to claim 25, wherein the third value is equal to the first value.

27. A device according to claim 25, wherein said control means converts the data into the signal value on the basis of a ratio of the value that represents the width of the range between the first and second values to a value of a difference between the first value and the data value, and the value that represents the width of the range between the third and fourth values.

28. A device according to claim 27, wherein said control means converts the data into the signal value corresponding to a moving amount from the first value by multiplying the ratio of the value that represents the width of the range between the first and second values to the difference between the first value and the data value, by the value that represents the width of the range between the third and fourth values.

29. A system which communicates information between an optical device that comprises movable optical means, position detection means for detecting a position of said optical means between first and second positions by dividing the position into a plurality of values between the first and second values, and driving control means for driving said optical means on the basis of a position command value and a position signal detected by said position detection means, and an external device connected to said optical device, comprising:
   normalization means for normalizing at least one of the position signal output from said position detection means and the position command value into position information on the basis of a predetermined position resolution.

30. A system according to claim 29, wherein said external device transmits a position command value to said optical device, which normalizes the position command value using said normalization means.

31. A system according to claim 29, wherein the position signal detected by said position detection means is normalized by said normalization means, and the normalized position information is transmitted to said external device.

32. An optical device which comprises an image sensing lens having movable optical means and control means for controlling a drive of said movable optical means based on a position of said movable optical means within a movable range thereof, detected by position detection means with a resolution thereof, and position command means for generating a driven position command for said optical means,
   wherein said position command means generates the driven position command on the basis of predetermined entire range normalized position information, and
   said control means converts the driven position command of said position command means to a further driven position command capable of corresponding to the resolution of said position detection means by using said entire range normalized position information so as to control the drive of said movable optical means, when resolution of said position command means is different from the resolution of said position detection means.

33. An optical device according to claim 32, wherein the driven position command of said position command means is proportional to the further driven position command converted by said control means.

34. An optical device according to claim 33, wherein said position command means includes an accessory.

35. An optical device according to claim 33, wherein said position command means includes a camera.

36. An optical device according to claim 33, wherein said movable optical means includes one of a focus lens, zoom lens or aperture stop.

37. An optical device according to claim 32, wherein said position command means includes an accessory.

38. An optical device according to claim 37, wherein said movable optical means includes focus lens, zoom lens or aperture stop.

39. An optical device according to claim 37, wherein said image sensing lens and said accessory include communication means, and said driven position command is communicated through said communication means.

40. An optical device according to claim 32, wherein said position command means includes a camera.

41. An optical device according to claim 40, wherein said movable optical means includes focus lens, zoom lens or aperture stop.

42. An optical device according to claim 40, wherein said image sensing lens and said image sensing lens and said camera include communication means, and said driven position command is communicated through said communication means.

43. An optical device according to claim 34, wherein said movable optical means includes focus lens, zoom lens or aperture stop.

44. An optical device according to claim 35, wherein said movable optical means includes focus lens, zoom lens or aperture stop.

45. An optical device according to claim 34, wherein said image sensing lens and said accessory include communication means, and said driven position command is communicated through said communication means.

46. An optical device according to claim 35, wherein said image sensing lens and said image sensing lens and said camera include communication means, and said driven position command is communicated through said communication means.

47. An optical device according to claim 32, wherein said movable optical means includes one of focus lens, zoom lens or aperture stop.

48. An image sensing lens which comprises movable optical means and control means for controlling a drive of said movable optical means based on a position of said movable optical means within a movable range thereof, detected by position detection means with a resolution thereof, comprising:

control means for converting a driven position command input from a position command means to a further driven position command capable of corresponding to a resolution of said position detection means by using an entire range normalized position information so as to control the drive of said movable optical means, when a resolution of said position command means which generates a driven position command of said movable optical means on the basis of a predetermined entire range normalized position information is different from the resolution of said position detection means.

49. An accessory transmitting a driven position command to an image sensing lens which comprises movable optical means and control means for detecting a position of said movable optical means within a movable range thereof with a resolution of a position detection means and for converting an input driven position command to the driven position command capable of corresponding to a resolution of said position detection means by using an entire range normalized position information so as to control the drive of said movable optical means, wherein the driven position command is on the basis of a resolution different from the resolution of said position detection means and is generated based on-the entire range normalized position information.

50. A camera transmitting a driven position command to an image sensing lens which comprises movable optical means and control means for detecting a position of said movable optical means within a movable range thereof with a resolution of a position detection means and for converting an input driven position command to the driven position command capable of corresponding to a resolution of said position detection means by using an entire range normalized position information so as to control the drive or said movable optical means, wherein the driven position command is on the basis of a resolution different from the resolution of said position detection means and is generated based on the entire range normalized position information.

* * * * *